(12) United States Patent
Montero

(10) Patent No.: US 12,491,395 B2
(45) Date of Patent: Dec. 9, 2025

(54) FIRE SYSTEM INTEROPERABILITY PROTOCOL

(71) Applicant: Carrier Corporation, Palm Beach Gardens, FL (US)

(72) Inventor: Antonio Montero, Bradenton, FL (US)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 477 days.

(21) Appl. No.: 17/983,683

(22) Filed: Nov. 9, 2022

(65) Prior Publication Data

US 2023/0149759 A1 May 18, 2023

Related U.S. Application Data

(60) Provisional application No. 63/278,543, filed on Nov. 12, 2021.

(51) Int. Cl.
*H04L 69/085* (2022.01)
*A62C 37/50* (2006.01)
*H04L 67/12* (2022.01)

(52) U.S. Cl.
CPC .............. *A62C 37/50* (2013.01); *H04L 67/12* (2013.01); *H04L 69/085* (2022.05)

(58) Field of Classification Search
CPC ........ A62C 37/50; H04L 69/085; H04L 67/12
USPC ..................................................... 455/404.1
See application file for complete search history.

(56) References Cited

U.S. PATENT DOCUMENTS 7,117,258 B2   10/2006   Lee et al.
7,120,129 B2   10/2006   Ayyagari et al.
8,370,911 B1    2/2013   Mallard
8,922,658 B2   12/2014   Galvin
9,191,383 B2   11/2015   Trani
9,230,373 B2    1/2016   Dziadosz et al.
(Continued)

FOREIGN PATENT DOCUMENTS

CN    102123482 A    7/2011
CN    102523110 A    6/2012
(Continued)

OTHER PUBLICATIONS

Johnson Controls, "Simplex ES Network ES Net Network Applications, Communications, Options and Specifications", Rev. 11, dated Aug. 2021, 18 pages.

*Primary Examiner* — Maria El-Zoobi
(74) *Attorney, Agent, or Firm* — CANTOR COLBURN LLP

(57) ABSTRACT

A method and emergency system for performing a system interoperability protocol. A method may include discovering, at a first interoperability node of a first network including a first plurality of network nodes, and a second interoperability node of a second network including a second plurality of network nodes, the first network is different from the second network; and performing a protocol version compatibility check between the first interoperability node and the second interoperability node responsive to discovering the second interoperability node. The method can also include performing a function availability check of the second interoperability node responsive to the protocol version compatibility check; and providing interoperability functions to the second interoperability node.

15 Claims, 4 Drawing Sheets

(56) References Cited

U.S. PATENT DOCUMENTS

| | | | |
|---|---|---|---|
| 10,644,949 B2 | 5/2020 | Cebere | |
| 2003/0202510 A1* | 10/2003 | Witkowski | H04L 49/3009 370/386 |
| 2005/0170855 A1* | 8/2005 | Comer | H04W 4/14 455/466 |
| 2014/0340222 A1* | 11/2014 | Thornton | H05B 47/19 340/539.17 |
| 2015/0256399 A1 | 9/2015 | Kim et al. | |
| 2018/0213349 A1* | 7/2018 | Panje | H04L 12/283 |
| 2020/0287775 A1* | 9/2020 | Khasis | H04W 12/009 |

FOREIGN PATENT DOCUMENTS

| | | |
|---|---|---|
| CN | 110807905 A | 2/2020 |
| CN | 112947172 A | 6/2021 |
| EP | 2898490 A1 | 7/2015 |
| WO | 2008032014 A1 | 3/2008 |
| WO | 2014044818 A1 | 3/2014 |

* cited by examiner

FIRE SYSTEM INTEROPERABILITY PROTOCOL

CROSS-REFERENCE TO RELATED APPLICATIONS

This application claims the benefit of Provisional Application No. 63/278,543 filed Nov. 12, 2021, the disclosure of which is incorporated herein by reference in its entirety.

BACKGROUND

The present disclosure relates to network communications, and more specifically, to a fire system interoperability protocol.

Emergency alarm systems such as fire alarm systems, for example, include various notification and input devices. In today's environment, emergency systems are generally independent of other emergency systems. These traditionally independent emergency systems have limited different products from the same brand from being able to interoperate without any prior cross configuration. In addition, these traditionally independent emergency systems have not enabled the emergency system to expand using different products from different brands (that have different function) to share a common set of functions. Accordingly, there remains a need to an improvement to enable interoperable emergency systems.

BRIEF DESCRIPTION

According to an embodiment, a method for performing a system interoperability protocol is provided. The method includes discovering, at a first interoperability node of a first network comprising a first plurality of network nodes, and a second interoperability node of a second network comprising a second plurality of network nodes, wherein the first network is different from the second network; and performing a protocol version compatibility check between the first interoperability node and the second interoperability node responsive to discovering the second interoperability node; performing a function availability check of the second interoperability node responsive to the protocol version compatibility check; and providing interoperability functions to the second interoperability node. In one or more embodiments, the first network and the second networks may be two independently configured networks.

In addition to one or more of the features described herein, or as an alternative, further embodiments include discovering the second interoperability node enables the discovery of the second plurality of network nodes through the second interoperability node.

In addition to one or more of the features described herein, or as an alternative, further embodiments include determining a set of interoperability functions that are available on the second network through the second interoperability node.

In addition to one or more of the features described herein, or as an alternative, further embodiments include interoperability functions that comprise at least one of: a paging function, an external auxiliary input function, a pre-recorded network interoperability message function, and a request grant/deny priority function.

In addition to one or more of the features described herein, or as an alternative, further embodiments include directly communicating with the second interoperability node.

In addition to one or more of the features described herein, or as an alternative, further embodiments include detecting an updated configuration in the first network or the second network; and repeating the discovery step to perform an update based at least in part on the updated configuration in the first network or the second network.

In addition to one or more of the features described herein, or as an alternative, further embodiments include using a first network and a second network that are independent fire system networks.

In addition to one or more of the features described herein, or as an alternative, further embodiments include detecting an event in the first network; and transmitting a status message to the second network through the second interoperability node, wherein the status message provides an indication of the event in the first network.

According to an embodiment, an emergency system for implementing a system interoperability protocol is provided. The system can include a first interoperability node of a first network, the first network comprising a first plurality of network nodes; and a second interoperability node of a second network, the second network comprising a second plurality of network nodes, wherein the first network is different from the second network. The first interoperability node is configured to discover the second interoperability node of the second network; responsive to discovering the second interoperability node, perform a protocol version compatibility check between the first interoperability node and the second interoperability node; perform an interoperability function availability check of the second interoperability node; and responsive to the interoperability function availability check, provide one or more interoperability functions to the second interoperability node based at least in part on the interoperability function availability check.

In addition to one or more of the features described herein, or as an alternative, further embodiments include discovering the second interoperability node enables the discovery of the second plurality of network nodes through the second interoperability node.

In addition to one or more of the features described herein, or as an alternative, further embodiments include a first interoperability node that is configured to determine a set of interoperability functions that are available on the second network through the second interoperability node.

In addition to one or more of the features described herein, or as an alternative, further embodiments include interoperability functions that comprise at least one of: a paging function, an external auxiliary input function, a pre-recorded network interoperability message function, and a request grant/deny priority function.

In addition to one or more of the features described herein, or as an alternative, further embodiments include a first interoperability node that is configured to directly communicating with the second interoperability node.

In addition to one or more of the features described herein, or as an alternative, further embodiments include a first interoperability node that is configured to detect an update of a configuration of the first network or the second network; and repeat the discovery step to perform an update based at least in part on the updated configuration to the first network or the second network.

In addition to one or more of the features described herein, or as an alternative, further embodiments include a first network and a second network that are independent fire networks.

In addition to one or more of the features described herein, or as an alternative, further embodiments include a first interoperability node that is configured to detect an event in the first network; and transmit a status message to the second network through the second interoperability node, wherein the status message provides an indication of the event in the first network.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Today, existing technologies do not enable direct interoperability between nodes of independent networks. Generally, a translation node is required to exchange messages between the two networks and direct communication is not enabled. The techniques described herein provide interoperability between two independent networks. Interoperability is a protocol that allows the independently configured systems that have no knowledge of each other to learn from each other and share basic functions that are required for a fire panel. That is, the techniques provide for dynamically sharing and interoperating on-demand between two or more independent fire networks without the need for prior across network device and node configuration. Although described herein that the interoperability protocol may be applied to fire systems, it should be appreciated that the interoperability protocol may be applied to other systems (which may include emergency systems, etc.).

A detailed description of one or more embodiments of the disclosed system and method are presented herein by way of exemplification and not limitation with reference to the Figures.

Figure 1:
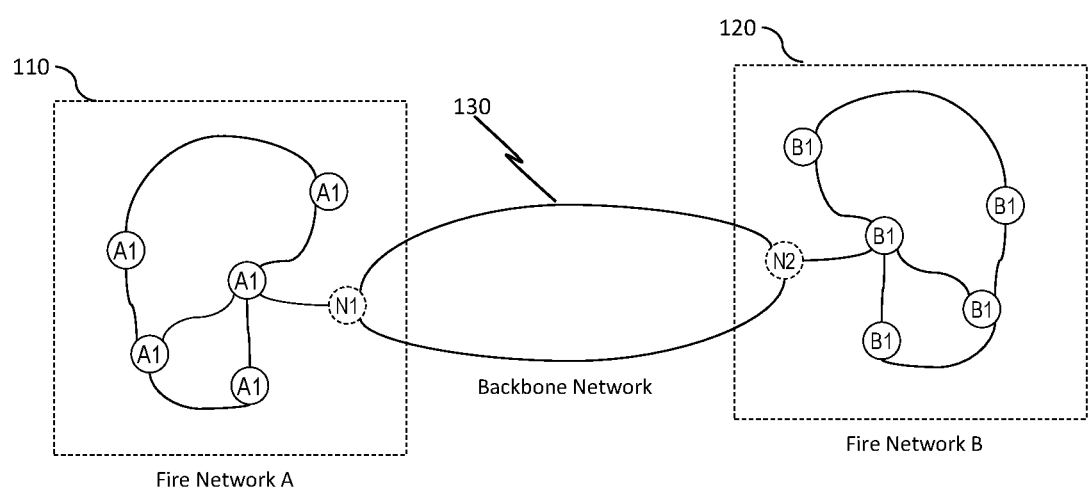
FIG. 1 illustrates an exemplary system for implementing a system interoperability protocol in accordance with one or more embodiments of the disclosure.

FIG. 1 depicts an example system 100 comprising a first network 110 and a second network 120 that is connected over a backbone network 130. The first network 110 is shown comprising a plurality of network nodes A1. The plurality of network nodes A1 is communicatively coupled to each other network node A1 and can exchange messages between each of the connected network nodes A1. The first network 110 can include a network node that functions as an interoperability node N1. The interoperability node N1 is configured to communicate with an interoperability node of a one or more other networks. The second network 120 is shown comprising a plurality of network nodes B1. The plurality of network nodes B1 is communicatively coupled to each other and can exchange messages between each of the connected network nodes B1. The second network 120 can include a network node that functions as an interoperability node N2.

The first interoperability node of a first network 110 that communicates with a second interoperability node of the second network 120 in accordance with one or more embodiments of the disclosure. The interoperability node N2 is configured to communicate and exchange status and control/command messages with the interoperability nodes N1 over the backbone network 130 after establishing a connection. The first network 110 and the second network 120 may be fire alarm system networks. Each of the network nodes A1, B1 may be a fire panel, where each of the fire panels can be coupled to and control accessory devices such as smoke detectors, strobe lights, etc. In addition, the fire panels can be configured to obtain the status, detected alarms, etc. from the connected accessory devices.

The backbone network(s) 130 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In one or more embodiments of the disclosure, the network services/infrastructure can include an IP-based communication standard. For example, the IP standard may include IPv4, IPv6 unicast/multicast routing. In addition, various IPv4, IPv6 tables may be used for identifying the nodes in each of the networks. In some embodiments, a domain name service or (MDNS) may be used for identifying the network nodes in each of the networks.

The interoperability nodes N1, N2 are configured to perform a sequence of steps to establish the interoperability protocol (which may be referred to herein as the fire panel interoperability protocol). The sequence of steps can include a discovery phase, an authorization/compatibility check phase, and an interoperability ready phase after establishing the connection between the interoperability nodes N1, N2. The discovery phase allows the interoperability nodes to discover the network nodes of the network. The authorization/compatibility phase ensures the correct nodes are provided access and determining the functions that are compatible between the one or more independent networks 110, 120. Finally, the interoperability ready phase allows the interoperability nodes N1, N2 to communicate over the established channel of the backbone network 130 that is used to provide status messages or command/control messages between the connected networks 110, 120. Further details of each of the phases are discussed below with reference to FIG. 3.

Figure 2:
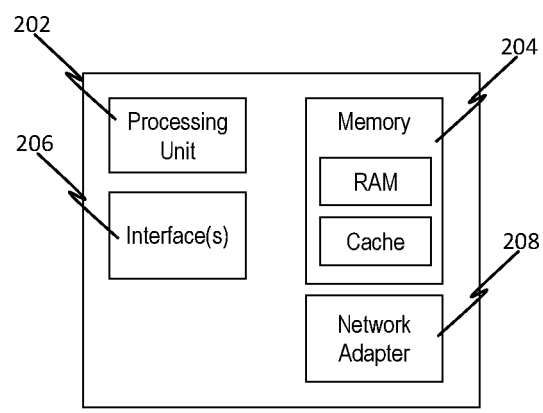
FIG. 2 illustrates a block diagram of an exemplary node representative of a network node or an interoperability node in accordance with one or more embodiments of the disclosure.

Referring now to FIG. 2, in which an exemplary node 200, representative of any of the network nodes and/or interoperability nodes of FIG. 1, that is used to implement the embodiments of the present disclosure is shown. Node 200 is only illustrative and is not intended to suggest any limitation as to the scope of use or functionality of embodiments of the invention described herein.

As shown in FIG. 2, node 200 is shown in the form of a general-purpose computing device. The components of node 200 may include, but are not limited to, one or more processors 202, a memory 204, interface 206, and network adapter 208. In one or more embodiments of the disclosure, the processor 202 can include a processor 202 of a general-purpose computer, special purpose computer, or other programmable data processing apparatus configured to execute instruction via the processor of the computer or other programmable data processing apparatus.

Nodes 200 can include a variety of computer system readable media. Such media may be any available media that is accessible by node 200, and it includes both volatile and non-volatile media, removable and non-removable media. Memory 204 can include computer system readable media. The memory 204 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), etc.). Node 200 may further include other removable/non-removable, volatile/non-volatile computer system storage media. The processor 202 and a memory 204 are configured to carry out the operations for the fire system interoperability protocol.

The memory 204 may include one or more program modules (not shown) such as operating system(s), one or more application programs, other program modules, and program data. Each of the operating systems, one or more application programs, other program modules, and program data or some combination thereof, may include an implementation of a networking environment. The program modules generally carry out the functions and/or methodologies of embodiments of the invention as described herein.

Node 200 may also communicate with one or more external devices through the interface 206 such as a keyboard, a pointing device, a display, etc.; one or more devices that enable a user to interact with node 200; and/or any devices (e.g., network card, modem, etc.) that enable node 200 to communicate with one or more other computing devices.

Still yet, node 200 can communicate with one or more networks such as a local area network (LAN), a general wide area network (WAN), and/or a public network (e.g., the Internet) via network adapter 208. As depicted, network adapter 208 communicates with the other components of node 200. It should be understood that although not shown, other hardware and/or software components could be used in conjunction with node 200. In one or more embodiments, the interoperability nodes N1, N2 can include a communication interface(s) to communicate with the network nodes that are local to the network, and the interoperability node can include a communication interface to communicate with other interoperability nodes. It can be appreciated the node 200 can include other components or modules and is not limited by the components shown in FIG. 2.

Figure 3:
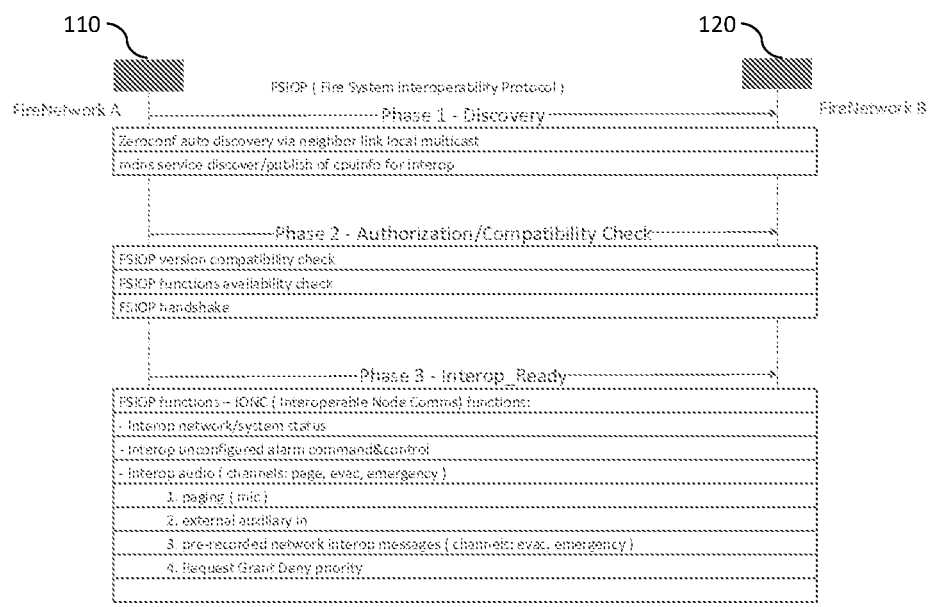
FIG. 3 illustrates an overview of an exemplary system interoperability protocol in accordance with one or more embodiments of the disclosure.

FIG. 3 depicts a diagram 300 of a high-level overview of the fire interoperability protocol in accordance with one or more embodiments of the disclosure. To initiate the interoperability protocol, the interoperability node N1 enters the discovery phase. In the discovery phase, the interoperability node N1 discovers the network node A1 in its network 110 and further discovers the network nodes B1 of another network 120. In one or more embodiments of the disclosure, the discovery process can be performed by exchanging a plurality of messages between each of the network nodes of the first network. The network nodes B1 of the second network 120 may be similarly configured to exchange messages between each of the network nodes. It can be appreciated the discovery process may be repeated upon the detection of a configuration update in any of the network nodes or networks.

In the authorization/compatibility check phase, the interoperability node determines whether the interoperability node of both networks operate according to the same protocol version. For example, it may be determined whether the interoperability nodes support IPv4 or IPv6 or some other compatible protocol. In one or more embodiments of the disclosure, the interoperability node may query an IPv4 or IPv6 table to determine the compatibility, or in another embodiment, the interoperability nodes may query the other nodes directly.

If it is determined to be compatible, the next step is a function availability check is performed to determine the set of functions that are available in the network nodes of the other network. The functions that may be available in the fire system network nodes may include paging, external auxiliary input, pre-recorded network interoperability messages (evacuation, emergency), request grant/deny priority. Otherwise, if the compatibility check fails, the process is terminated.

The available functions are then compared to the functions of the first network, and if matching functions or common functions are found between the first interoperability node and the second operability node, those features can be enabled for the interoperability communications over the backbone network.

In one or more embodiments, an optional authorization process may be performed to restrict access to trusted nodes. In some embodiments, a handshake procedure may be performed between the interoperability nodes. The handshake procedure may be an exchange of a known identifier (UUID), hash, password, etc. The handshake procedure may be optional and not required in each of the embodiments.

Upon completion of the authorization/compatibility phase, the process enters the final phase which is the interoperability ready phase where the communication is established over the backbone network 130. The interoperability nodes are now configured to exchange status messages, control/command messages, etc. The interoperability nodes may exchange network/system status information, alarm command and control messages, or provide live audio or pre-recorded audio to the other network through the interoperability node. It should be understood the functions are not limited to those described herein but other functions can be considered to be within the scope of the disclosure.

Figure 4:
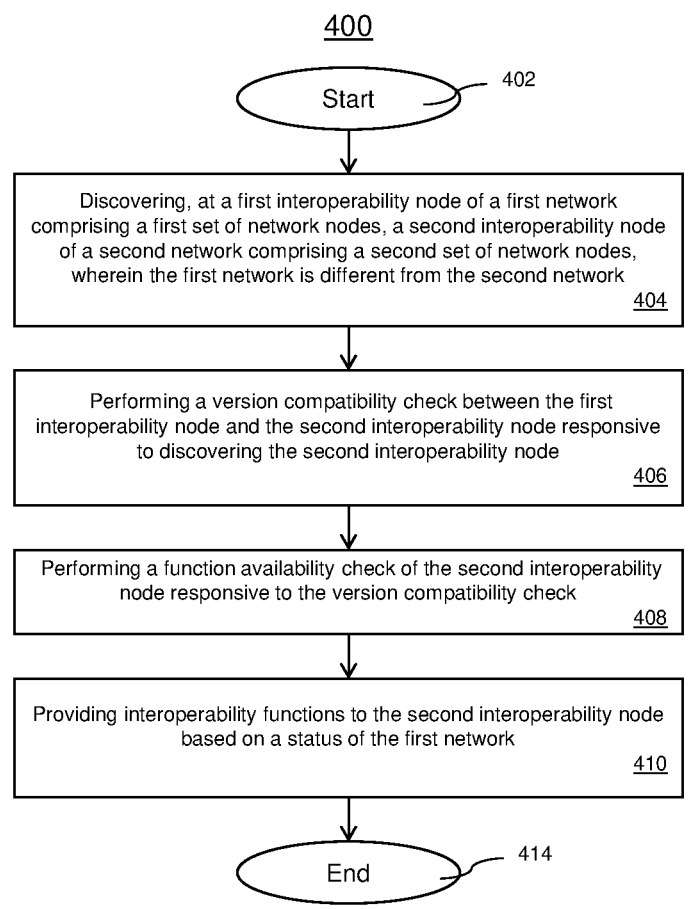
FIG. 4 illustrates a flowchart of an exemplary method for establishing a communication using the system interoperability protocol in accordance with one or more embodiments of the disclosure.

Turning now to FIG. 4, a process flow diagram illustrating an exemplary method 400 for implementing a fire system interoperability protocol to establish an interoperable communication between fire networks is generally shown in accordance with one or more embodiments of the present disclosure. Method 400 may be implemented in conjunction with any appropriate computer system, such as system 100 of FIG. 1. The method 400 begins in block 402, and in block 404 of method 400, a first interoperability node of a first network comprising a first set of network nodes discovers a second interoperability node of a second network comprising a second set of network nodes, wherein the first network is different from the second network.

In block 406, a version compatibility check is performed between the first interoperability node and the second interoperability node responsive to discovering the second interoperability node.

In block 408, a function availability check of the second interoperability node is performed responsive to the version compatibility check. In some embodiments of the disclosure, a security measure such as a handshake procedure is performed. The handshake process between the interoperability nodes can include exchanging a password or identifier to ensure no unauthorized access is provided to unwanted devices/systems.

In block 410, interoperability functions to the second interoperability node are provided. In one or more embodiments of the disclosure, after the interoperability communication is established, the interoperability node of the first network can provide various status messages, control commands, etc. to the interoperability node of the second network.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

The technical effect and benefits include enabling, at a local level, the rapid development of different fire network systems having their own distinct functions are able to interoperate without any prior cross configuration. At a broader level, it enables the expansion of current systems with devices having a different function yet are able to share a common set of available functions.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for performing a system interoperability protocol, the method comprising:
   discovering, at a first interoperability node of a first network comprising a first plurality of network nodes, and a second interoperability node of a second network comprising a second plurality of network nodes, wherein the first network is different from the second network;
   performing a protocol version compatibility check between the first interoperability node and the second interoperability node responsive to discovering the second interoperability node;
   performing an interoperability function availability check of the second interoperability node responsive to the protocol version compatibility check; and
   providing interoperability functions to the second interoperability node such that the first interoperability node and the second interoperability node exchange messages and exchange commands;
   wherein the first network and the second network are independent fire system networks.

2. The method of claim 1, wherein discovering the second interoperability node enables the discovery of the second plurality of network nodes through the second interoperability node.

3. The method of claim 1, further comprising determining a set of interoperability functions that are available on the second network through the second interoperability node.

4. The method of claim 1, wherein the interoperability functions comprise at least one of: a paging function, an external auxiliary input function, a pre-recorded network interoperability message function, and a request grant/deny priority function.

5. The method of claim 1, further comprising directly communicating with the second interoperability node.

6. The method of claim 1, further comprising detecting an updated configuration in the first network or the second network; and
   repeating the discovery step to perform an update based at least in part on the updated configuration in the first network or the second network.

7. The method of claim 1, further comprising detecting an event in the first network; and
   transmitting a status message to the second network through the second interoperability node, wherein the status message provides an indication of the event in the first network.

8. An emergency system implementing a system interoperability protocol, the system comprising:
   a first interoperability node of a first network, the first network comprising a first plurality of network nodes;
   a second interoperability node of a second network, the second network comprising a second plurality of network nodes, wherein the first network is different from the second network;
   wherein the first interoperability node is configured to:
      discover the second interoperability node of the second network;
      responsive to discovering the second interoperability node, perform a protocol version compatibility check between the first interoperability node and the second interoperability node;

perform an interoperability function availability check of the second interoperability node; and responsive to the interoperability function availability check, provide one or more interoperability functions to the second interoperability node based at least in part on the interoperability function availability check, such that the first interoperability node and the second interoperability node exchange messages and exchange commands;

wherein the first network and the second network are independent fire networks.

9. The system of claim 8, wherein discovering the second interoperability node enables the discovery of the second plurality of network nodes through the second interoperability node.

10. The system of claim 8, wherein the first interoperability node is configured to determine a set of interoperability functions that are available on the second network through the second interoperability node.

11. The system of claim 8, wherein the interoperability functions comprises at least one of: a paging function, an external auxiliary input function, a pre-recorded network interoperability message function, and a request grant/deny priority function.

12. The system of claim 8, wherein the first interoperability node is configured to directly communicating with the second interoperability node.

13. The system of claim 8, wherein the first interoperability node is configured to detect an update of a configuration of the first network or the second network; and repeat the discovery step to perform an update based at least in part on the updated configuration to the first network or the second network.

14. The system of claim 8, wherein the first interoperability node is configured to detect an event in the first network; and transmit a status message to the second network through the second interoperability node, wherein the status message provides an indication of the event in the first network.

15. The method of claim 1, further comprising dynamically determining, at the first interoperability node, a set of interoperability functions available at the second interoperability node, wherein the determination is based on real-time communication with the second interoperability node; and wherein providing the interoperability functions to the second interoperability node is based on the dynamically determined set of interoperability functions.

* * * * *